(12) United States Patent
Chew

(10) Patent No.: US 12,451,158 B2
(45) Date of Patent: Oct. 21, 2025

(54) HEAD GIMBAL ASSEMBLY HEIGHT DETERMINATION WITH CHARGE-TO-VOLTAGE CONVERTER

(71) Applicant: Avago Technologies International Sales Pte. Limited, Singapore (SG)

(72) Inventor: Kin Wai Roy Chew, Singapore (SG)

(73) Assignee: Avago Technologies International Sales Pte. Limited, Singapore (SG)

( * ) Notice: Subject to any disclaimer, the term of this patent is extended or adjusted under 35 U.S.C. 154(b) by 77 days.

(21) Appl. No.: 18/499,119

(22) Filed: Oct. 31, 2023

(65) Prior Publication Data

US 2025/0140287 A1    May 1, 2025

(51) Int. Cl.
| | |
|---|---|
| G11B 5/48 | (2006.01) |
| G11B 5/60 | (2006.01) |
| G11B 21/12 | (2006.01) |

(52) U.S. Cl.
CPC ............ *G11B 5/4826* (2013.01); *G11B 5/486* (2013.01); *G11B 5/6005* (2013.01); *G11B 5/6017* (2013.01); *G11B 21/12* (2013.01)

(58) Field of Classification Search
None
See application file for complete search history.

(56) References Cited

U.S. PATENT DOCUMENTS

| | | | | |
|---|---|---|---|---|
| 4,931,887 | A * | 6/1990 | Hegde | G01B 7/14 |
| 5,095,470 | A * | 3/1992 | Oka | G11B 11/10576 |
| | | | | 360/59 |
| 5,136,250 | A * | 8/1992 | Abdelli | G01B 7/023 |
| | | | | 327/579 |
| 5,986,497 | A * | 11/1999 | Tsugai | G01P 15/125 |
| | | | | 327/554 |
| 6,002,542 | A * | 12/1999 | Bruccoleri | G11B 5/59688 |
| | | | | 360/77.02 |
| 7,199,960 | B1 * | 4/2007 | Schreck | G11B 21/21 |
| | | | | 360/78.04 |
| 7,256,957 | B1 * | 8/2007 | Rahgozar | G11B 5/6017 |
| 7,729,079 | B1 * | 6/2010 | Huber | G11B 5/6005 |
| | | | | 360/75 |
| 8,611,035 | B1 * | 12/2013 | Bajikar | G11B 5/6017 |
| | | | | 360/75 |
| 11,120,826 | B1 * | 9/2021 | Johnson | G11B 5/6029 |
| 11,756,582 | B1 * | 9/2023 | Pulici | G11B 5/6017 |
| | | | | 360/78.04 |
| 12,165,680 | B1 * | 12/2024 | Sentieri | G11B 5/607 |

(Continued)

*Primary Examiner* — William J Klimowicz
(74) *Attorney, Agent, or Firm* — King Intellectual Asset Management

(57) ABSTRACT

A circuit for determining head gimbal assembly (HGA) height is provided. The circuit includes a first switch configured to be controlled by a first clock signal, an amplifier, and a first capacitor coupled to the first switch, wherein the first capacitor is formed by at least part of a head gimbal assembly and a storage media. The circuit further includes a second capacitor coupled to an input of the amplifier, and an output of the amplifier, wherein the second capacitor is configured to store a charge from the first capacitor over one or more cycles of the first clock signal. The amplifier is configured to generate an output voltage based, at least in part, on a change in the capacitance of the first capacitor over the one or more cycles of the first clock signal.

20 Claims, 3 Drawing Sheets

(56) References Cited

U.S. PATENT DOCUMENTS

| | | | |
|---|---|---|---|
| 2002/0039244 A1* | 4/2002 | Wilson | G11B 27/36 360/60 |
| 2003/0099233 A1* | 5/2003 | Bae | G06G 7/186 370/389 |
| 2007/0183078 A1* | 8/2007 | Matsushita | G11B 5/6017 360/75 |
| 2007/0253090 A1* | 11/2007 | Hirano | G11B 5/6017 |
| 2008/0158715 A1* | 7/2008 | Hirano | G11B 5/6005 |
| 2008/0266702 A1* | 10/2008 | Bliss | G11B 5/6005 |
| 2013/0057301 A1* | 3/2013 | Balachandran | G01P 15/0802 324/679 |
| 2024/0005956 A1* | 1/2024 | Pulici | G11B 5/607 |

* cited by examiner

HEAD GIMBAL ASSEMBLY HEIGHT DETERMINATION WITH CHARGE-TO-VOLTAGE CONVERTER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for head gimbal assembly height determination in hard disk drives.

BACKGROUND

The height of the head gimbal assembly (HGA) is typically measured as a function of the capacitance ($C_{hga}$) between the HGA and underlying media (e.g., storage media, such as a hard disk drive platter or other magnetic storage media). Height of the HGA, referring to the relative position of the HGA above (or below) the media, can be determined by measuring a change in capacitance using capacitive height sensing (CHS). Thus, the proximity of the HGA to the platter is determined by measuring a shift in capacitance ($C_{delta}$) as the head approaches the disk. Due to the small capacitances involved in measurements of $C_{delta}$, process, voltage, and temperature (PVT) variations introduce inconsistencies.

Thus, methods, systems, and apparatuses for more robust HGA height determination are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
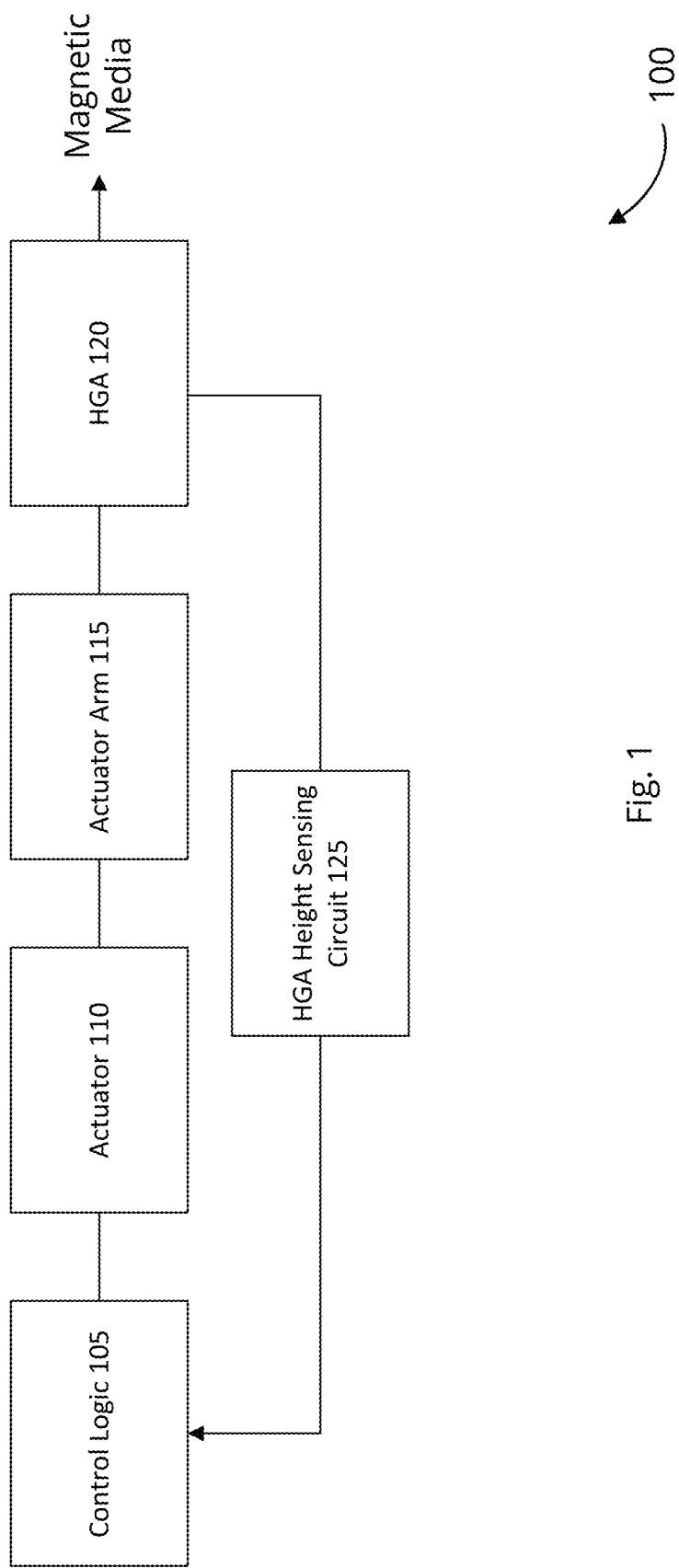
FIG. 1 is a schematic block diagram of a control system for a HGA, in accordance with various embodiments.

Various embodiments set forth a device for more robust HGA height determination utilizing a charge-to-voltage converter.

In some embodiments, an apparatus for HGA height determination is provided. The apparatus includes a first circuit configured to convert charge into a voltage. The first circuit includes a first switch configured to be controlled by a first clock signal, the first switch comprising a first terminal and a second terminal, an amplifier comprising an inverting input, noninverting input, and an output, wherein the inverting input is coupled to the second terminal, and a first capacitor coupled to the first terminal of the first switch. The first capacitor may be formed between a head gimbal assembly and media. The first circuit further includes a second capacitor comprising third terminal and fourth terminal, the third terminal coupled to the inverting input of the amplifier, and the fourth terminal coupled to the output of the amplifier. The second capacitor may be configured to store a charge from the first capacitor over one or more cycles of the first clock signal. The amplifier may be configured to generate an output voltage based, at least in part, on a change in the capacitance of the first capacitor over the one or more cycles of the first clock signal.

In some embodiments, a system for HGA height determination is provided. The system includes a head gimbal assembly and a storage media. Capacitance may be formed between at least part of the head gimbal assembly and the storage media. The system further includes a circuit configured to determine a height of the head gimbal assembly relative to the storage media. The circuit includes a first subcircuit configured to convert a charge to voltage. The first subcircuit includes a first switch configured to be controlled by a first clock signal, the first switch comprising a first terminal and a second terminal, an amplifier comprising an inverting input, noninverting input, and an output, wherein the inverting input is coupled to the second terminal, and a first capacitor coupled to the first terminal of the first switch. The first capacitor may be formed by at least part of the head gimbal assembly and the storage media. The first subcircuit further includes a second capacitor comprising third terminal and fourth terminal, the third terminal coupled to the inverting input of the amplifier, and the fourth terminal coupled to the output of the amplifier. The second capacitor may be configured to store a charge from the first capacitor over one or more cycles of the first clock signal. The amplifier may be configured to generate an output voltage based, at least in part, on a change in the capacitance of the first capacitor over the one or more cycles of the first clock signal.

In further embodiments, a charge-to-voltage converter circuit for HGA height determination is provided. The circuit includes a first switch configured to be controlled by a first clock signal, an amplifier, and a first capacitor coupled to the first switch, wherein the first capacitor is formed by at least part of a head gimbal assembly and a storage media. The circuit further includes a second capacitor coupled to an input of the amplifier, and an output of the amplifier, wherein the second capacitor is configured to store a charge from the first capacitor over one or more cycles of the first clock signal. The amplifier is configured to generate an output voltage based, at least in part, on a change in the capacitance of the first capacitor over the one or more cycles of the first clock signal.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

The height of the HGA affects the capacitance ($C_{hga}$) that is formed between the HGA and the media (also referred to interchangeably as a disk). As the HGA gets closer to the disk, $C_{hga}$ increases. Thus, the height of the HGA refers to the position of the HGA above and/or below the underlying media. HGA height refers to the distance between the HGA and the underlying media (e.g., how high above the media and/or how far below the underlying media). Typically, HGA height can be determined by measuring the change in capacitance, $C_{delta}$. However, because $C_{delta}$ is very small (e.g., <1.5% changes in $C_{hga}$), it is difficult to measure small capacitance changes across PVT variations.

Conventional approaches to HGA height determination utilize a relaxation oscillator, in which capacitance between the HGA and media, $C_{hga}$, is charged and discharged continuously within a range of threshold voltages. As $C_{hga}$ increases, the time to complete one charging and discharging cycle also increases. Thus, changes in $C_{hga}$ can be determined by measuring the oscillation period. As such, performance is sensitive to the stability and accuracy of the oscillator period to detect the small changes in $C_{hga}$. However, relaxation oscillators are sensitive across PVT variations, and to comparator jitter. Moreover, a long dwell time (e.g., approximately 1000 cycles are required to achieve 0.1% resolution) relative to the switched-capacitor charge-to-voltage converter described herein is utilized for each measurement so as to allow small changes in the oscillation period to accumulate to a detectable value, which increases head wear.

A proposed HGA height sensing architecture is set forth in the embodiments below. Specifically, a discrete-time, switched-capacitor charge-to-voltage converter is utilized to measure the change in $C_{delta}$. Specifically, the amount of charge stored in $C_{hga}$ is converted to a proportional voltage, which is then compared to a threshold voltage or digitized via an ADC. By utilizing a charge-to-voltage converter instead of an oscillator, the height determination becomes less sensitive to timing, and PVT variations.

FIG. 1 is a schematic block diagram of a control system 100 for a HGA assembly. The control system 100 may include control logic 105, actuator 110, actuator arm 115, HGA 120, and HGA height sensing circuit 125. It should be noted that the system 100 is schematically illustrated in FIG. 1, and that modifications to the various elements and other arrangements of the system 100 may be possible and in accordance with the various embodiments.

In various embodiments, the control system 100 may more generally be configured to control a head stack assembly (HSA) of a hard disk drive (HDD). In some examples, control of the HSA may include adjustment of the height of the HGA 120 via the control logic 105. Specifically, a distance between the HGA 120 and underlying media, such as a hard disk drive platter, may be adjusted based on a determination of the height of the HGA 120 (or a change in height of the HGA 120) via the HGA height sensing circuit 125, as will be described in greater detail below with respect to FIG. 2.

Accordingly, in various embodiments, the control logic 105 may be configured to control the actuator 110, which causes movement of the actuator arm 115. Control logic 105 may include hardware, software, or a combination of hardware and software. The control logic 105 may, in various examples, be configured to generate a control signal which may drive or otherwise actuate the actuator 110. In some examples, control logic 105 may be configured to control an elevator function (e.g., vertical position control) of the HGA 120 via up and/or down movement of the actuator arm 115.

In various examples, the actuator 110 may include, without limitation, a voice coil actuator (e.g., a permanent magnet and wire coil actuator), moving magnet actuator, shaped memory alloy (SMA) actuator, piezoelectric, thermal, or other suitable actuators. The actuator 110 may be configured to cause the actuator arm 115 to move. The actuator arm 115 may be coupled to the actuator 110 via a pivot bearing or other swage connection, at a first end (e.g., a proximal end). The HGA 120 may, in turn, be coupled an opposite end of the actuator arm 115 (e.g., a distal end of the actuator arm 115, away from the connection to the actuator 110). In various examples, the HDD may include one or more platters. A respective actuator arm 115 and respective HGA 120 may be disposed on (e.g., over) and/or disposed under (e.g., below) each respective platter of the one or more platters.

In various embodiments, a position (or change in position) of the HGA 120 may be determined by the HGA height sensing circuit 125, and provided as feedback to the control logic 105 for adjustments to the position of the HGA 120. Details of the HGA height sensing circuit 125 are provided below with respect to FIG. 2.

Figure 2:
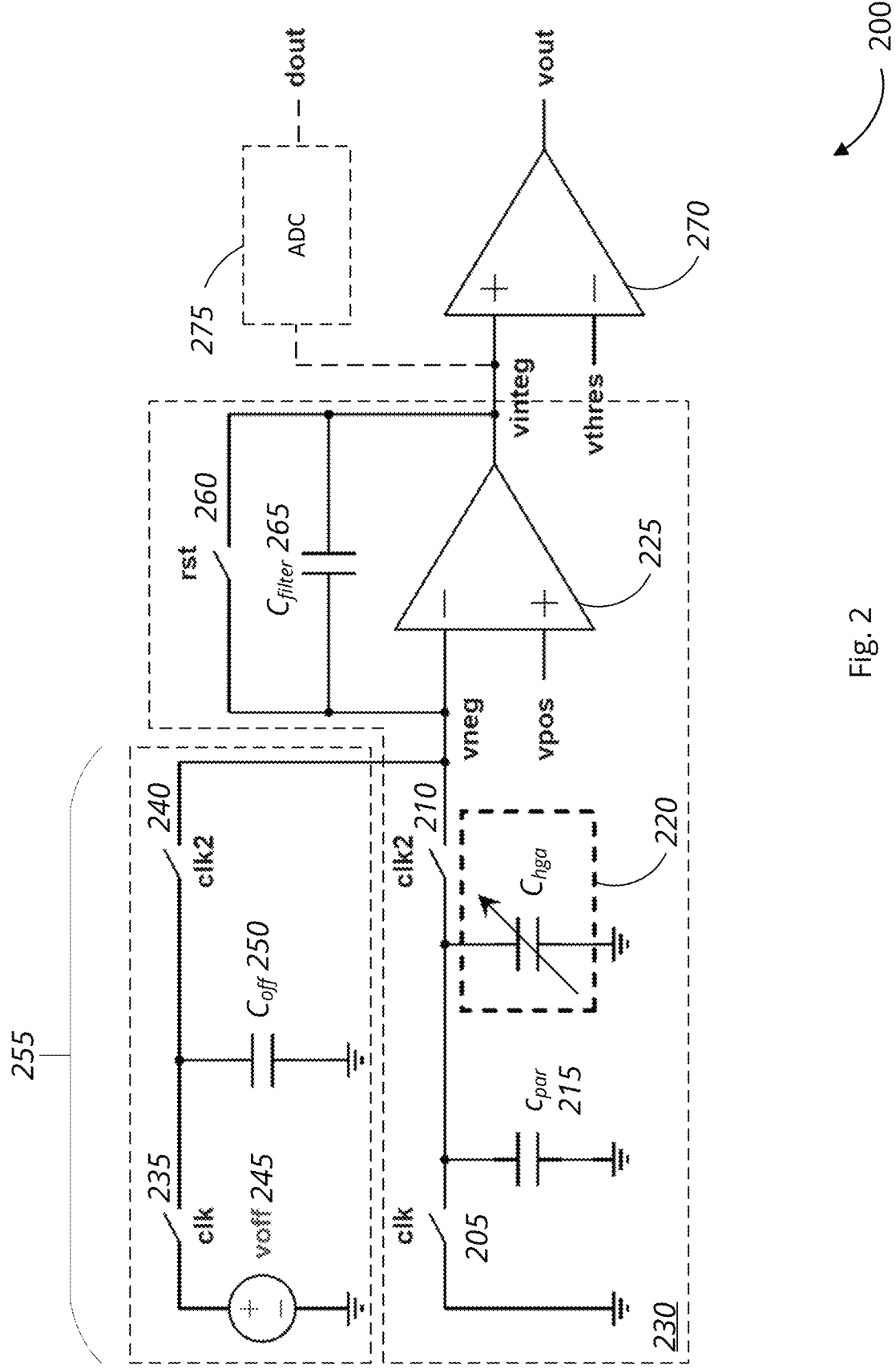
FIG. 2 is a schematic diagram of a circuit for HGA height determination, in accordance with various embodiments.

FIG. 2 is a schematic diagram of a circuit 200 for HGA height determination, in accordance with various embodiments. The circuit 200 includes a first switch 205, second switch 210, first capacitor 215, HGA capacitor ($C_{hga}$) 220, amplifier 225, reset switch 260, and filter capacitor 265, which together form a charge-to-voltage converter subcircuit 230. The circuit further includes a third switch 235 and fourth switch 240, offset voltage (voff) 245, and offset capacitor 250, which together may be referred to as offset subcircuit 255. The circuit 200 further includes a comparator 270, and analog-to-digital converter (ADC) 275. It should be noted that the circuit 200 is schematically illustrated in FIG. 2, and that modifications to the various elements and other arrangements of the circuit 200 may be possible and in accordance with the various embodiments.

In contrast with conventional approaches, the circuit 200 for HGA height determination utilizes a charge-to-voltage converter subcircuit 230 and offset subcircuit 255 in place of a relaxation oscillator to measure the change in capacitance. In addition to allowing charges to build up over multiple cycles, the changes in capacitance may also be amplified, via amplifier 225, by using a larger voltage vpos and smaller filter capacitor 265, thereby allowing height detection to be more accurate. Moreover, the charge-to-voltage converter subcircuit 255 is insensitive to PVT variations, and parasitic components.

Accordingly, a discrete-time, switched-capacitor, charge-to-voltage converter configured to measure a change in capacitance between the HGA and underlying media is provided. Specifically, a charge stored by a capacitor over a first discrete time period (e.g., one or more cycles of a clock signal, such as CLK and/or CLK2) is used to determine a voltage. Accordingly, the circuit 200 is configured to determine a position of the HGA based on changes to the voltage between one or more successive discrete time periods.

In various embodiments, the capacitance between the HGA and disk is represented as a variable capacitor, $C_{hga}$ 220. In various examples, the $C_{hga}$ may be measured at a signal pad of the HGA. A pad, as used herein, refers to a signal pad of a circuit, such as, without limitation, an input/output pad, attenuating pad, or other conductive structure within the circuit from which a signal may be measured or input. A parasitic capacitance $C_{par}$ of the HGA may be represented by the first capacitor 215. In operation, the first switch 205 is controlled by a first clock signal, "CLK." The second switch, 210, is controlled by a second clock signal, "CLK2." The voltage at the first capacitor 215 and HGA pad 220 is referred to as "vcap." The offset subcircuit 255 includes a third switch 235, fourth switch 240, and offset capacitor ($C_{off}$) 250. Like the first switch 205, the third switch 235 is controlled by CLK. The fourth switch 240, like second switch 210, is controlled by CLK2.

In operation, the charge-to-voltage converter subcircuit 230 may be an integrator, in which the amplifier 225 outputs a voltage (vinteg), that is proportional to the integrated value of the in total charge applied to the inverting input of the amplifier 225. Thus, the charge stored by $C_{hga}$ 220 may be converted to an output signal, vinteg. The amplifier 225 may include, in various embodiments, both an inverting input and noninverting input. The terms "inverting" and "noninverting" refer to the pin configuration of an amplifier, where an inverting input refers to the (−) or "negative" terminal of an amplifier, and noninverting input refers to the (+) or "positive" terminal of an amplifier. Thus, the terms "inverting" and "noninverting" are used as a naming convention to differentiate between the terminals of the amplifier.

In various embodiments, the circuit 200 may further include offset subcircuit 255. The offset subcircuit 255 may be configured to remove a constant charge that would otherwise be injected by $C_{hga}$ 220 to the amplifier 225. Specifically, in some examples, $C_{off}$ 250 may be configured to remove a constant charge from $C_{hga}$ 220, such that only shifts in capacitance, $C_{delta}$, cause a change in vinteg ($V_{delta}$). For example, as will be described in greater detail below with respect to the timing diagrams of FIG. 2, when the second and fourth switches 210, 240 are enabled via CLK2, charges from $C_{hga}$ 220 are drained (e.g., removed) by the offset capacitor, $C_{off}$ 250, when a first voltage polarity is applied. In some embodiments, when a second voltage polarity (opposite the first voltage polarity) is applied, the reverse may occur, where $C_{hga}$ 220 removes charges from the amplifier 225 and $C_{off}$ 250 replenishes a constant charge to the $C_{hga}$ 220.

In various examples, voltage changes due to $C_{delta}$ may be amplified by multiple cycles of charge injection (e.g., from $C_{hga}$ 220 to the amplifier 225), increases to the charging voltage (vpos), and/or by utilizing a smaller filter capacitor, $C_{filter}$ 265. Based on vinteg, detection of HGA height may be determined. For example, in some embodiments, the comparator 270 may be configured to compare vinteg to a threshold voltage (vthresh) to determine whether vinteg exceeds vthresh. By counting the number of cycles that vinteg exceeds vthresh, a change in the height of the HGA may be determined. In some further examples, an ADC 275 may be configured to generate a digital output (dout) based on vinteg. Accordingly, changes in vinteg may be determined digitally, based on changes to dout.

In various embodiments, the change in capacitance may calculated as follows. Taking $C_{hga1}$ as the capacitance of the HGA at a first position, and $C_{hga2}$ as the capacitance of the HGA at a second position, $C_{hga2}$ may be given as the follows:

$$C_{hga2} = C_{hga1} + c_{delta} \qquad \text{Eq. 1}$$

At the first position, the measured voltage (vinteg$_1$) may be given as:

$$vinteg_1 = vpos + n \cdot \left[\frac{(C_{par} + C_{hga1}) \cdot vpos + C_{off} \cdot (vpos - v_{off})}{C_{filter}}\right] \qquad \text{Eq. 2}$$

At the second position, the measured voltage (vinteg$_2$) may be given as:

$$vinteg_2 = vpos + n \cdot \left[\frac{(C_{par} + C_{hga2}) \cdot vpos + C_{off} \cdot (vpos - v_{off})}{C_{filter}}\right] \qquad \text{Eq. 3}$$

As a result, $C_{delta}$ may be determined by measuring $v_{delta}$, where $v_{delta}$=vinteg$_2$−vinteg$_1$. Thus, $v_{delta}$ may be given by:

$$v_{delta} = vpos \cdot n \cdot \left[\frac{C_{delta}}{C_{filter}}\right] \qquad \text{Eq. 4}$$

Accordingly, in various examples, the change in capacitance may be determined as a function of $v_{delta}$, which may itself be determined based, at least in part, on the output of the comparator 270, "vout," and/or the digital output of the ADC 275, dout. In some examples, the output of the comparator 270 may indicate, for example, whether a change in the height of the HGA has exceeded a threshold distance (e.g., whether the HGA has moved by a threshold magnitude). In other examples, the output of the ADC 275, dout, may be indicative of a change in height of the HGA. Alternatively, dout may be associated with the position of the HGA.

In various examples, the charge-to-voltage converter subcircuit 230 may be a discrete-time, switched-capacitor, charge-to-voltage converter. As the change in $C_{hga}$ is small, the voltage difference $V_{delta}$ conversion is also small. To amplify $V_{delta}$, multiple charge-to-voltage conversions may be performed per measurement of HGA height. For each charge-to-voltage conversion, the charges injected by $C_{hga}$ 220 may be accumulated at the $C_{filter}$ 265. Specifically, $C_{filter}$ 265 may have a first terminal coupled to the inverting input of the amplifier 225 and a second terminal coupled to the output of the amplifier 225. In this way, the $C_{filter}$ 265 may be configured to accumulate charges from the $C_{hga}$ 220 (e.g., over n-cycles of CLK and/or CLK2). As a result, after an n-number of conversions, $V_{delta}$ is amplified an n-number of times (e.g., n*$V_{delta}$). The charges stored in $C_{filter}$ 265 may be reset after every measurement via the reset switch 260.

In various embodiments, a dynamic range of the charge-to-voltage converter subcircuit 230 may be increased via the offset subcircuit 255. By pre-charging $C_{off}$ 250 with a constant offset voltage, voff 245, $C_{off}$ 250 may remove a fixed charge from $C_{hga}$ 220. In some examples, $C_{off}$ 250 may be configured to remove a majority of the charges that are injected to $C_{filter}$ 265 by $C_{hga}$ 220. Accordingly, a fixed charge, as used herein, refers to an amount of charge that does not change between clock cycles of CLK and/or CLK2, and that is removed by $C_{off}$ 250 from $C_{hga}$ 220. Thus, the fixed charge is the fixed amount of charge that is removed from the $C_{hga}$ 220. To determine $C_{delta}$, rather than the absolute value of $C_{hga}$, the majority of constant charges injected by $C_{hga}$ may be removed in this manner. This allows more sensitive determination of the charges injected by $C_{delta}$. In some alternative embodiments, instead of (or in addition to) an offset capacitor $C_{off}$ 250, the offset subcircuit 255 may utilize other methods of removing charge, such as a constant current source.

For example, if $C_{delta}$=1% of $C_{hga}$ 220, conversion of the charges stored by $C_{hga}$+$C_{delta}$ to voltage, the portion of vinteg that changed by $C_{delta}$ (e.g., $V_{delta}$) will only be approximately 1% of vinteg. However, if 98% of the charges stored by $C_{hga}$ 220 are removed via $C_{off}$ 250, the charge-to-voltage conversion would convert charges stored by 0.02*$C_{hga}$+$C_{delta}$ to voltage. As a result, $V_{delta}$ would be 33% of the vinteg, thereby increasing the circuit's sensitivity to $C_{delta}$ by 33 times.

Thus, in some examples, a small variation in $C_{hga}$ (e.g., a small $C_{delta}$) may be amplified to improve accuracy, by using a large vpos, a large number of cycles, n, and/or a small $C_{filter}$ 265. Moreover, changes in vinteg (e.g., $v_{delta}$) are insensitive to parasitic capacitance and PVT variations. Parasitic capacitance ($C_{par}$) and clock feedthrough (e.g., CLK and/or CLK2) may result in a constant offset that can be calibrated off, for example, via the offset subcircuit 255. Moreover, metal-on-metal (MOM) capacitors, like the capacitor formed between the HGA and the underlying media, have low voltage and temperature coefficients. In further embodiments, the dwell time for measurement may be reduced relative to conventional techniques, also reducing head wear.

In yet further examples, accuracy of the clock signal(s) (e.g., CLK and/or CLK2) may not be as critical to the accuracy of the height determination, so long as the circuit 200 settles before the next charge cycle, allowing for more robust operation. Moreover, as the circuit 200 does not rely on a high-speed accurate oscillator, power consumption may also be reduced. In further examples, because a constant voltage is applied to the inverting input of the amplifier 225, leakage reduction techniques may be implemented.

In an alternative embodiment, an alternative approach may include taking a direct voltage measurement across $C_{hga}$ directly, as the HGA height changes. The change in capacitance of $C_{hga}$ will result in an inversely proportional change in voltage across $C_{hga}$. In yet further embodiments, the circuit 200 may be implemented in other contexts for detecting small changes in capacitance. For example, in other embodiments, the circuit 200 may be implemented as part of various systems, including, without limitation, a touch sensor, pressure switch, or strain gauge.

Figure 3:
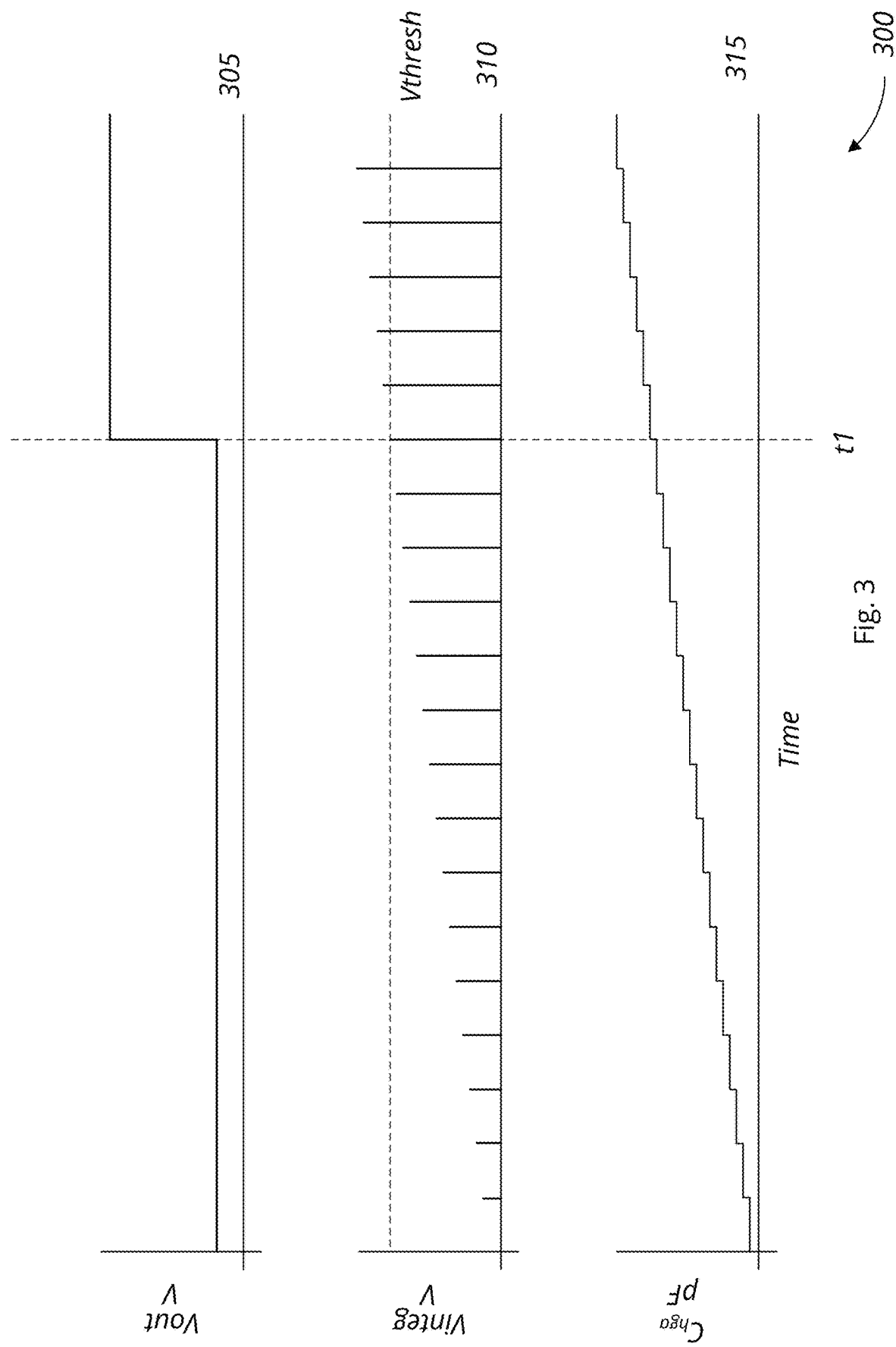
FIG. 3 is a timing diagram of the various signals in the circuit for HGA height determination, in accordance with various embodiments.

FIG. 3 is a timing diagram of simulated signals 300 of the circuit 200. Specifically, $C_{hga}$ is increased, from 10.0 pF to 10.2 pF, which is a change of 2% or 0.2 pF. As can be seen in the timing diagram, the small change in capacitance can be more robustly detected and measured as a voltage by the circuit 200 of FIG. 2.

Specifically, FIG. 3 illustrates vout 305, vinteg 310, and $C_{hga}$ over time. As the capacitance $C_{hga}$ 315 increases, the converted voltage vinteg 310 reflects the stepped changes in $C_{hga}$ 315. As vinteg 310 reaches threshold voltage, Vthresh, at time t1, the output signal Vout (e.g., of comparator 270) may be asserted, corresponding to a threshold height (e.g., a threshold change in height) of the HGA.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. An apparatus comprising:
   a first circuit comprising:
      a first switch configured to be controlled by a first clock signal, the first switch comprising a first terminal and a second terminal;
      an amplifier comprising an inverting input, noninverting input, and an output, wherein the inverting input is coupled to the second terminal;
      a first capacitor coupled to the first terminal of the first switch, wherein the first capacitor is formed between a head gimbal assembly and media; and
      a second capacitor comprising third terminal and fourth terminal, the third terminal coupled to the inverting input of the amplifier, and the fourth terminal coupled to the output of the amplifier, wherein the second capacitor is configured to store a charge from the first capacitor over one or more cycles of the first clock signal,
      wherein the amplifier is configured to generate an output voltage based, at least in part, on a change in the capacitance of the first capacitor over the one or more cycles of the first clock signal.

2. The apparatus of claim 1, wherein the output voltage is indicative of a change in height of the head gimbal assembly relative to the media.

3. The apparatus of claim 2, further comprising an analog-to-digital converter configured to convert the output voltage of the amplifier to a digital output, wherein the digital output is associated with a height of the head gimbal assembly.

4. The apparatus of claim 2, further comprising a comparator configured to compare the output voltage with a threshold voltage, wherein the comparator is configured to determine whether a change in the height of the head gimbal assembly exceeds a threshold distance.

5. The apparatus of claim 1, further comprising a second switch coupled in parallel with the second capacitor, the second switch configured to activate after all cycles of the one or more cycles of the first clock signal have elapsed.

6. The apparatus of claim 1, further comprising a second circuit configured to offset a fixed charge from the first capacitor, the second circuit comprising:
   a third switch comprising a fifth terminal and sixth terminal, the fifth terminal coupled to the inverting input of the amplifier, and the sixth terminal coupled to a third capacitor, the third switch controlled by the first clock signal,
   wherein the third capacitor is configured to remove a fixed amount of charge from the first capacitor each individual cycle of the one or more cycles of the first clock signal.

7. The apparatus of claim 6, further comprising a voltage source configured to pre-charge the third capacitor to an offset voltage between each individual cycle of the one or more cycles of the first clock signal.

8. A system comprising:
   a head gimbal assembly;
   a storage media, wherein capacitance is formed between at least part of the head gimbal assembly and the storage media; and
   a circuit configured to determine a height of the head gimbal assembly relative to the storage media, the circuit comprising:
      a first subcircuit comprising:
         a first switch configured to be controlled by a first clock signal, the first switch comprising a first terminal and a second terminal;
         an amplifier comprising an inverting input, noninverting input, and an output, wherein the inverting input is coupled to the second terminal;
         a first capacitor coupled to the first terminal of the first switch, wherein the first capacitor is formed by at least part of the head gimbal assembly and the storage media; and
         a second capacitor comprising third terminal and fourth terminal, the third terminal coupled to the inverting input of the amplifier, and the fourth terminal coupled to the output of the amplifier, wherein the second capacitor is configured to store a charge from the first capacitor over one or more cycles of the first clock signal,
         wherein the amplifier is configured to generate an output voltage based, at least in part, on a change in the capacitance of the first capacitor over the one or more cycles of the first clock signal.

9. The system of claim 8, wherein the output voltage is indicative of a change in height of the head gimbal assembly relative to the storage media.

10. The system of claim 9, wherein the circuit further comprises an analog-to-digital converter configured to convert the output voltage of the amplifier to a digital output, wherein the digital output is associated with a height of the head gimbal assembly.

11. The system of claim 9, wherein the circuit further comprises a comparator configured to compare the output voltage with a threshold voltage, wherein the comparator is configured to determine whether a change in the height of the head gimbal assembly exceeds a threshold distance.

12. The system of claim 8, further comprising a second switch coupled in parallel with the second capacitor, the second switch configured to activate after all cycles of the one or more cycles of the first clock signal have elapsed.

13. The system of claim 8, further comprising a second subcircuit configured to offset a fixed charge from the first capacitor, the second circuit comprising:
 a third switch comprising a fifth terminal and sixth terminal, the fifth terminal coupled to the inverting input of the amplifier, and the sixth terminal coupled to a third capacitor, the third switch controlled by the first clock signal,
 wherein the third capacitor is configured to remove a fixed amount of charge from the first capacitor each individual cycle of the one or more cycles of the first clock signal.

14. The system of claim 13, wherein the second subcircuit further comprises a voltage source configured to pre-charge the third capacitor to an offset voltage between each individual cycle of the one or more cycles of the first clock signal.

15. A circuit comprising:
 a first switch configured to be controlled by a first clock signal, the first switch comprising a first terminal and a second terminal;
 an amplifier comprising an inverting input, noninverting input, and an output, wherein the inverting input is coupled to the second terminal;
 a first capacitor coupled to the first terminal of the first switch, wherein the first capacitor is formed by at least part of a head gimbal assembly and a storage media; and
 a second capacitor comprising third terminal and fourth terminal, the third terminal coupled to the inverting input of the amplifier, and the fourth terminal coupled to the output of the amplifier, wherein the second capacitor is configured to store a charge from the first capacitor over one or more cycles of the first clock signal,
 wherein the amplifier is configured to generate an output voltage based, at least in part, on a change in the capacitance of the first capacitor over the one or more cycles of the first clock signal.

16. The circuit of claim 15, wherein the output voltage is indicative of a change in height of the head gimbal assembly relative to the storage media.

17. The circuit of claim 16, wherein the circuit further comprises an analog-to-digital converter configured to convert the output voltage of the amplifier to a digital output, wherein the digital output is associated with a height of the head gimbal assembly.

18. The circuit of claim 16, wherein the circuit further comprises a comparator configured to compare the output voltage with a threshold voltage, wherein the comparator is configured to determine whether a change in the height of the head gimbal assembly exceeds a threshold distance.

19. The circuit of claim 15 further comprising:
 a third switch comprising a fifth terminal and sixth terminal, the fifth terminal coupled to the inverting input of the amplifier, and the sixth terminal coupled to a third capacitor, the third switch controlled by the first clock signal,
 wherein the third capacitor is configured to remove a fixed amount of charge from the first capacitor each individual cycle of the one or more cycles of the first clock signal.

20. The circuit of claim 19, wherein the circuit further comprises a voltage source configured to pre-charge the third capacitor to an offset voltage between each individual cycle of the one or more cycles of the first clock signal.

* * * * *